Jan. 9, 1940.  J. A. WEBB  2,186,775

MACHINE FOR MAKING MULTIPLY BELTING

Filed May 10, 1937  5 Sheets-Sheet 1

Inventor
James A. Webb
Albert R. Henry
Attorney

Jan. 9, 1940. J. A. WEBB 2,186,775
MACHINE FOR MAKING MULTIPLY BELTING
Filed May 10, 1937 5 Sheets-Sheet 2
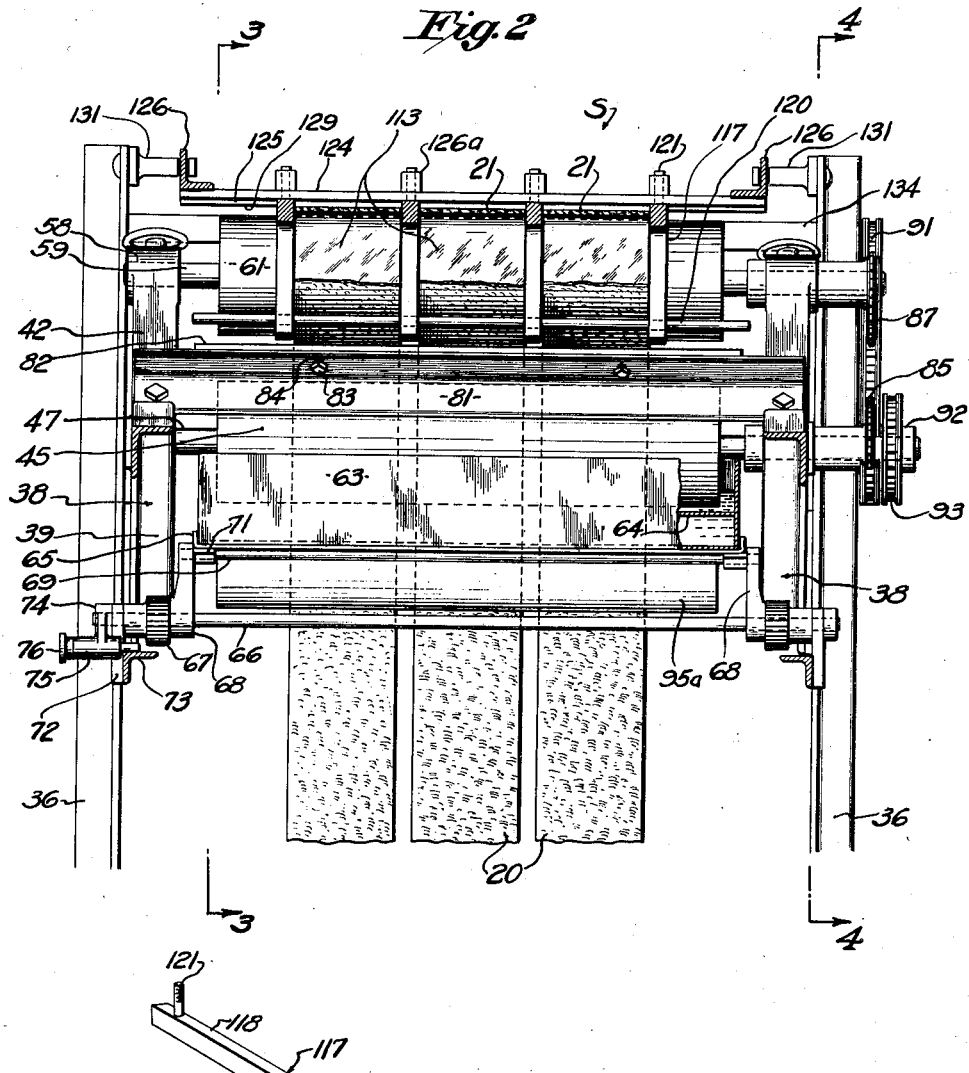
Fig. 2
Fig. 5
Inventor
James A. Webb
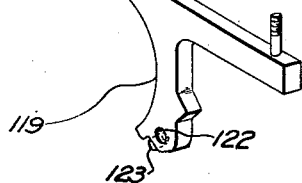
Attorney

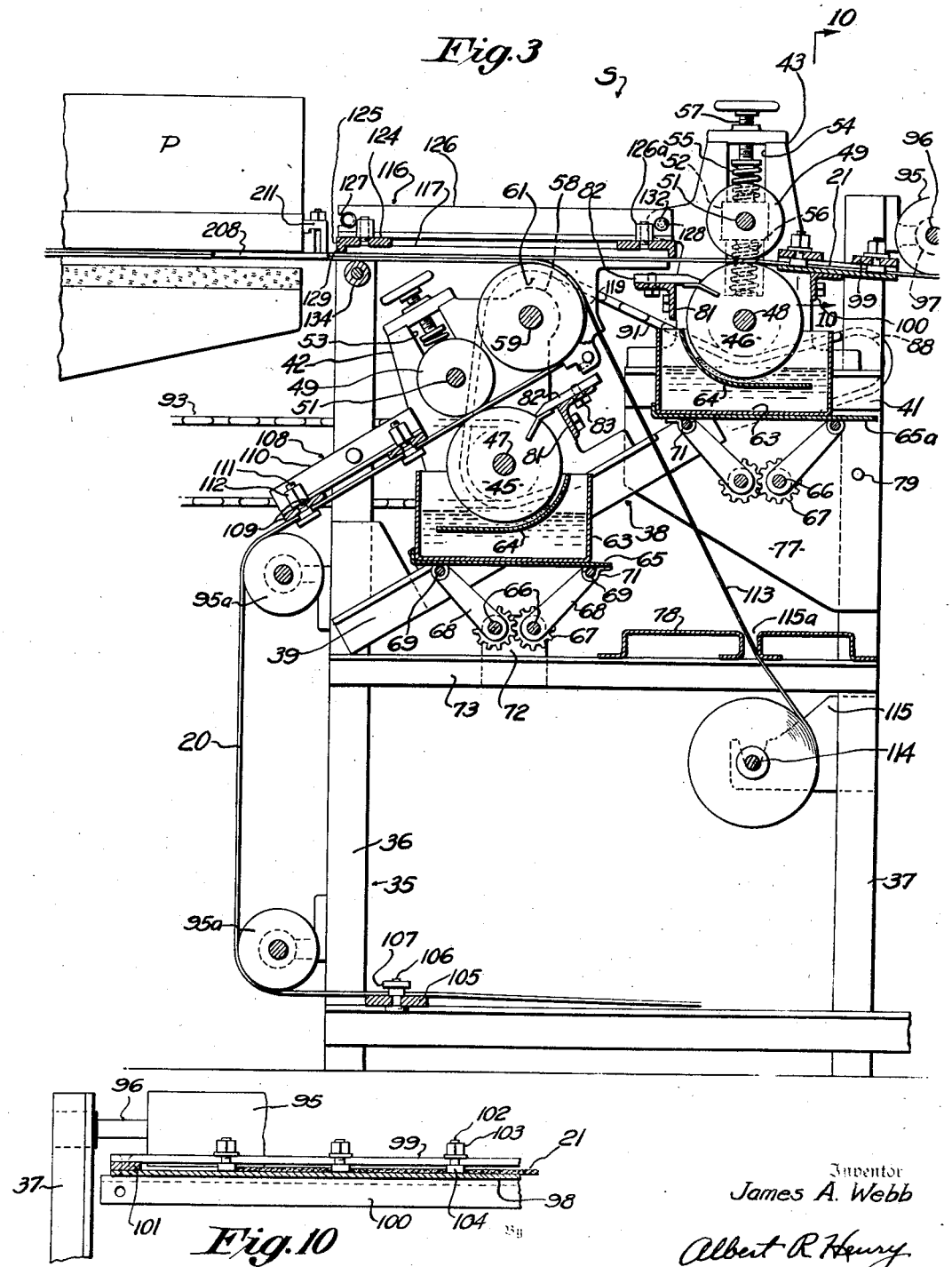

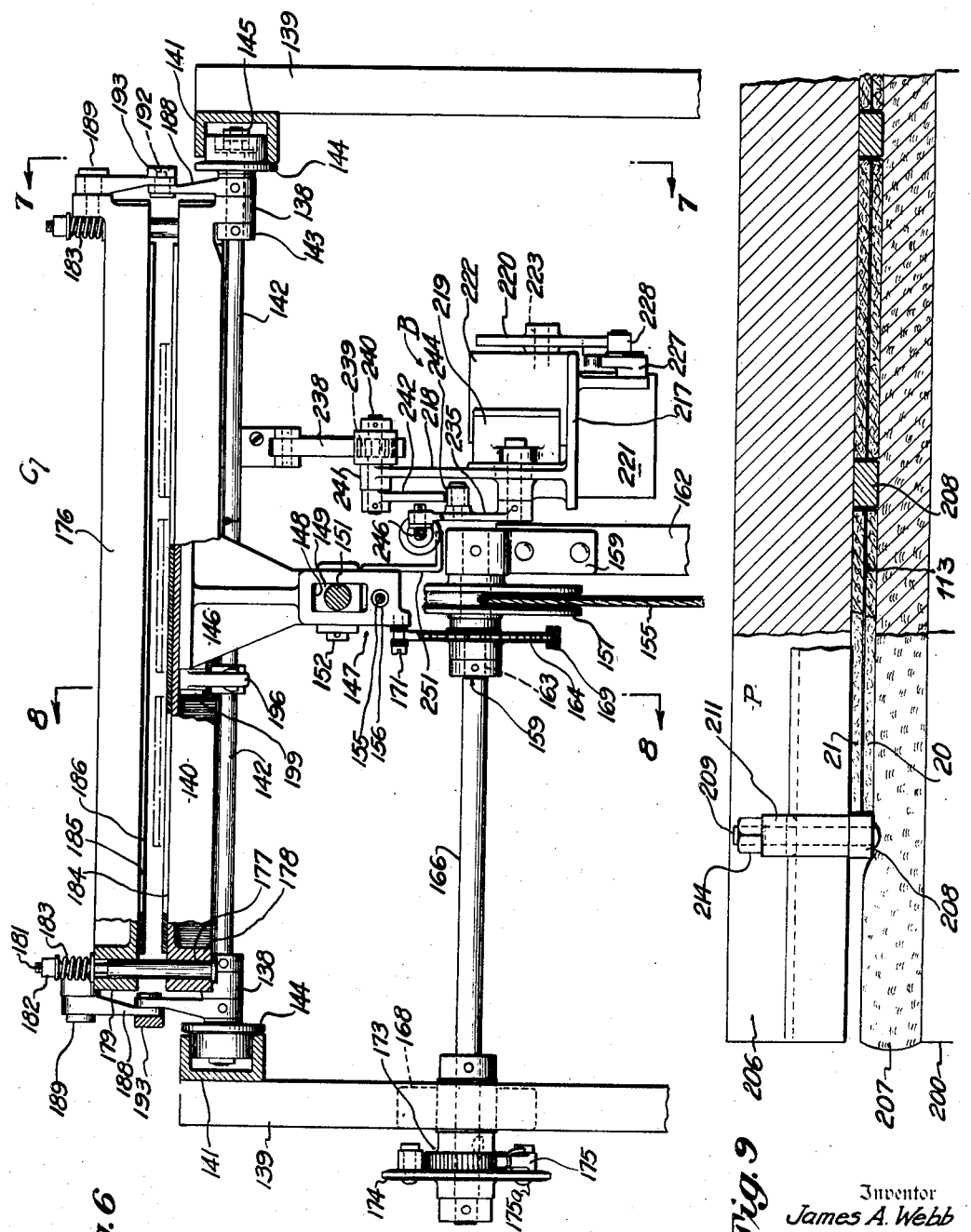

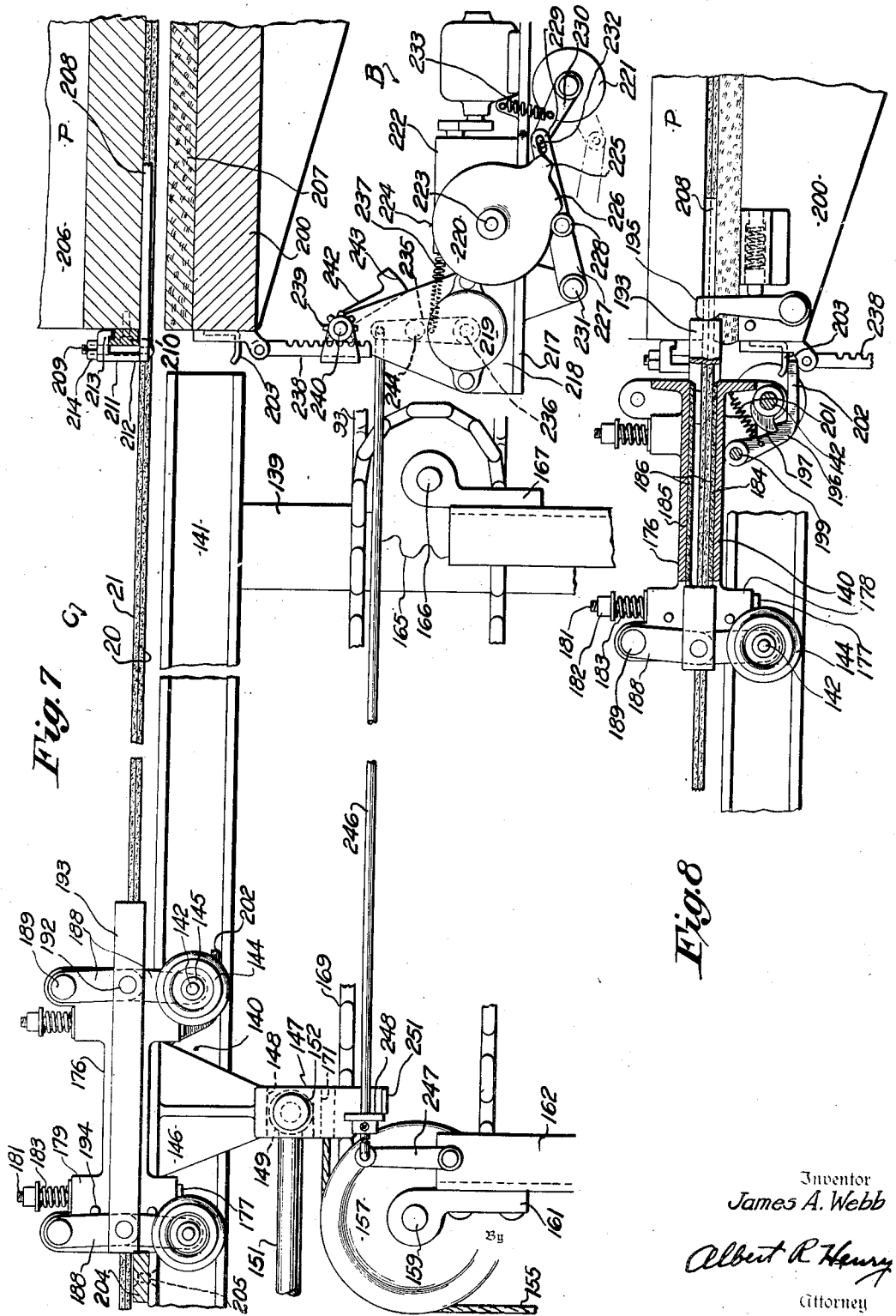

Patented Jan. 9, 1940

2,186,775

UNITED STATES PATENT OFFICE 2,186,775

MACHINE FOR MAKING MULTIPLY BELTING

James A. Webb, Buffalo, N. Y., assignor to J. A. Webb Belting Co., Inc., Buffalo, N. Y.

Application May 10, 1937, Serial No. 141,651

15 Claims. (Cl. 154—3)

This invention relates to the manufacture of belting, and it has particular reference to a method of, and a machine for, making multiply leather belts.

Leather belting has heretofore been made by cementing together superimposed plies by means of a suitable adhesive, and subjecting the laminated structure to pressure. For practical reasons, it is desirable to use a cellulosic compound, such as the "waterproof cement" of the industry, as the adhesive, but the employment of this material introduces a number of difficulties in manufacture. Thus, if the cement be employed only as a liquid, excess amounts are squeezed from between the plies when pressure is applied, causing the belt to stick to the press. Again, it has heretofore been deemed necessary to treat the plies with a preliminary, or sizing coat, which is allowed to dry prior to final assembly. Such operation obviously adds to the cost of manufacture.

It has also been proposed to use the adhesive in a solid form, known as "sheet cement", which is applied to the leather after a preliminary immersion in a bath of organic solvent which has the action of softening or dissolving the surface of the sheet. Such proposal, however, involves serious difficulties, particularly arising from variations in the degree of softening which are reflected in variations in adhesive power, and the complications attendant the handling of material in such tacky condition.

According to one aspect of the present invention, provision is made to secure belt plies to each other by means of liquid or sheet cement, or both conjointly, and according to a procedure which eliminates the necessity for pre-sizing the leather, or immersing the sheet cement in a softening bath. Generally speaking, this phase of the invention contemplates the application of a surface film of liquid cement directly to the surface of the ply, and introducing, between a pair of such surfaces, a layer or strip of dry, or unsoftened sheet cement, as the plies are brought into contact. The softening of the sheet is thereby effected in situ, and after the superimposition of the plies in their desired final relation. Following a determinable time interval, or what may be termed a quiescent period, during which the sheet becomes softened and merges into the liquid impregnating the pores of the leather, and during which some evaporation of excess solvent also may occur, the plies are subjected to pressure, thereby effecting the complete assembly.

The advantages of such a procedure in uniformly producing belting of good quality, and the savings effected over the prior methods, are of course readily apparent. It may here be mentioned, however, that the liquid cement should not be so thin as to be squeezed out from between the plies, nor so viscous as to be incapable of softening the sheet cement in the time interval allotted for this purpose.

According to another aspect of the invention, advantage is taken of the platen type of press, which is well known in the belt making art. Provision is made to bring the ply coating and assembling means quite close to the press, so that a stretch of belting which has just been assembled may be inserted in the press during each cycle of operation. The result is that there is obtained a progressive and intermittent action of coating, assembling with pre-softening and drying in situ, and pressing of the belting just assembled, and thus each unit of belting transmitted to the press is insured of receiving the same preliminary treatment.

In another general aspect of the invention, there is provided a novel means for forwarding the contacted plies to and through the press— a means which may be described as a small platen press, adapted to move toward and away from the true press intermittently and in properly timed relation. A customary manner of feeding belting, heretofore employed, has been to use pairs of rollers, one of which has been driven and the other of which has been spring pressed against the belting. Variations in the thickness of leather belting are, however, unavoidable, and thus there are variations in the pressure or tension which such rollers exert on the assembled belt. This condition tends to induce internal flow of the cement between the plies, and to impose variable tensions thereon, both of which factors adversely affect the uniformity of adherence of the plies, particularly along the edges thereof. Since ply separation indicates a defective belt, the present invention makes provision to prevent its development.

From the foregoing general outline, it will be understood that the present invention contemplates a machine including ply coating means, an intermittently operated platen press to which coated plies may be forwarded, and means for effecting the uniform movement of the belting, as well as a novel method of coating the plies prior to subjecting them to pressure. In the following portions of this specification, there will be described a form of machine preferred by me for accomplishing the objects of the invention, illustrated in the accompanying drawings, wherein:

Fig. 2 is an enlarged cross section on the line 2—2 of Fig. 1;

Fig. 3 is a section on the line 3—3 of Fig. 2;

Fig. 4 is a section on the line 4—4 of Fig. 2, diagrammatically showing the driving connections between the priming rolls and the conveying unit;

Fig. 5 is a perspective view of a guide element;

Fig. 6 is an enlarged section on the line 6—6 of Fig. 1;

Fig. 7 is a section on the line 7—7 of Fig. 6;

Fig. 8 is a fragmentary section on the line 8—8 of Fig. 6, showing the carriage in its fully advanced position;

Fig. 9 is an enlarged fragmentary cross-section through the press, showing the effect of the positioning bars on the pressed plies; and, Fig. 10 is a section on the line 10—10 of Fig. 3.

Figure 1:
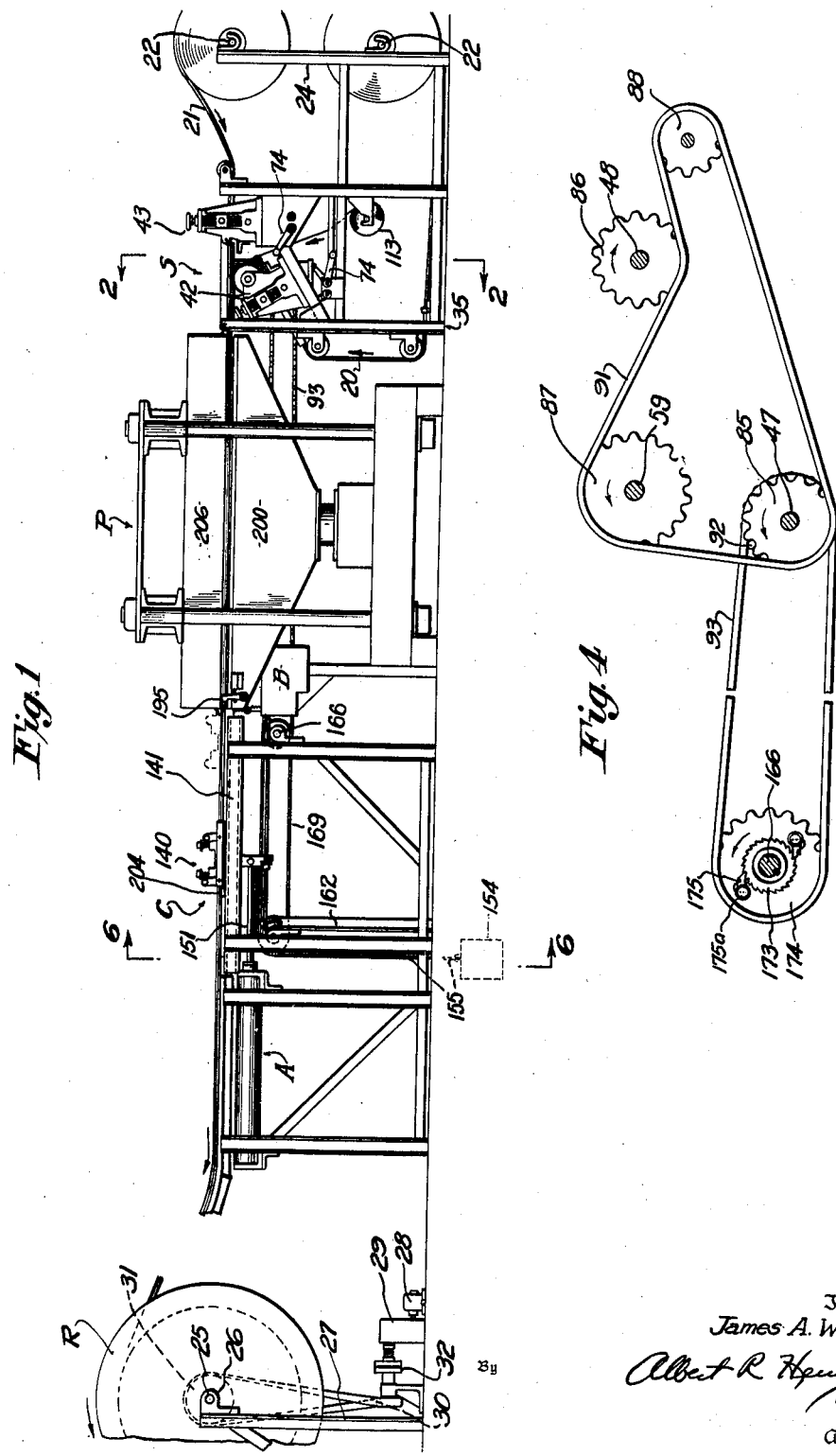
Fig. 1 is a side elevation of the machine.

Referring first to Fig. 1 for a general consideration of the several parts of the machine, it will be observed that they comprise a coating or ply treating unit S, an intermittently actuated platen press P, and a stock feeding mechanism C operated by means of a source of power A, all of which parts are more or less under the control of a timing mechanism B. The coating unit is so constructed as to receive the belt plies 20 and 21 from their supporting rolls or spindles, and to apply liquid cement, and sheet cement, between the faces thereof which come into mutual contact as the plies pass through this portion of the machine. As will be more fully described hereinafter, the arrangement is such that, after the plies are laid up, one on the other, they are periodically forwarded to the platens of the press P.

The press P, when closed, exerts pressure on the ply assembly, and, when open, has its platens sufficiently spaced to permit the stock feeding unit C to withdraw some of the belting already treated, and to bring between the platens that portion which has just previously emerged from the coating unit. The specific form of stock feeding apparatus herein illustrated is in the nature of a releasable clamp attached to a carriage, which reciprocates toward and away from the press under the force exerted in an air cylinder A, employed as the motive power.

When the press is closed, the jaws of the clamp C are open, and during this interval the clamp is brought to a point adjacent the discharge side of the press. Thereafter, the press opens, the clamp engages the belt and moves from right to left, and reaches the end of its stroke and releases its grip as the press once more closes. By means of suitable gearing and driving belts or chains, the unit S is caused to operate as the clamp moves forward with the belting, but is stopped while the clamp is disengaged. Thus it will be seen that the invention provides for the intermittent operation of the press, and the intermittent operation of the stock coating and feeding mechanism in timed relation to the movements of the press, so that belting may be coated, pressed, and delivered from the machine with a minimum of lost time or effort.

In the drawings, the machine has been illustrated as set up to produce three belts simultaneously, to facilitate an understanding of the guide members hereinafter discussed, and to indicate the capacity of the equipment. As these three belts are alike, the same reference numerals are employed for each. The several plies 20 and 21 are supplied from rolls disposed on spindles 22 which are journaled in open bearings secured to a frame 24, located at the right hand end of the machine. The plies, after having been contacted, pressed, and forwarded in the manner generally outlined above, are ultimately delivered in the form of belting to a reel R, located beyond the left hand end of the machine. The reel is provided with a shaft 25 journaled in bearings 26 which are mounted on a supporting frame 27. The reel is driven when desired by a motor 28 operating through a gear reduction unit 29 and belt connected pulleys 30 and 31—it being understood, in this connection, that a considerable stretch of belting may intervene between the clamp C and the reel R, and thus only occasional operation of the motor will be required. An adjustable friction clutch 32 is advantageously disposed in the reel drive mechanism to prevent the reel from reversing its intended direction of rotation.

The ply supporting and belt receiving devices just described are of simple and well known construction, and are more in the nature of adjuncts of the present invention, rather than of its essence. It is therefore believed that the foregoing short description will suffice.

*The sizing unit*

The sizing unit (Figs. 1, 2, and 3) comprises pairs of rollers through which the respective belt plies pass, to receive a coating of cement, together with means for supplying the cement and guiding and delivering the plies, in superimposed relation, to the inlet side of the press P.

The structure involves a frame 35 including pairs of uprights 36 and 37 which are connected by fabricated brackets 38 (Figs. 2 and 3). The brackets are each formed with a diagonal rail portion 39 and an elevated horizontal rail portion 41 to which aligned pairs of bearing pedestals, 42 and 43 respectively, are secured. Applicator rolls 45 and 46, which apply liquid cement to the plies 20 and 21, are mounted between the pedestal pairs 42 and 43 respectively by means of their pintles 47 and 48. A tension roll 49 is disposed above each applicator roll, and the pintles 51 thereof are received in bearing blocks 52 which are slidably mounted in slide portions 53, 54, formed in the pedestals 42 and 43 respectively. The blocks are each supported between spring pairs 55 and 56, the uppermost spring 55 of which is compressibly adjustable through an adjusting screw 57. This adjustment permits the rolls 49 to be forced toward the applicator rolls under any desired pressure.

The pedestals 42 are formed with additional bearings 58 which receive the pintles 59 of a traction roll 61.

The lower portion of each applicator roll is immersed in a tank 63 containing the coating liquid, which may be a somewhat viscous solution of waterproof cement in a volatile thinning agent. A curved shield 64 forming part of the tank follows the contour of a portion of the roll, and it serves to prevent spillage of the liquid under the influence of centrifugal effects when the roll is rotated. The tanks are supported on shelves 65, 65a, which are provided with lift mechanisms whereby each shelf and accompanying tank may be raised to the operative position illustrated, or lowered to a position where the tank may be bodily removed from the machine.

The lift mechanism for each tank includes a pair of spaced shafts 66 connected for mutual rotation by gears 67, and each carrying pairs of arms 68 connected by rods 69. One rod 69 is pivotally secured to the lower face of the shelf 65 or 65a by clips 71, while the remaining rod is permitted to slide freely along the bottom of the shelf. The rods thus provide horizontal supports for the shelf at any degree of angularity of the associated arms.

The lift mechanism beneath the roll 45 has its shafts 66 journaled in plates 72 which are secured to angles 73 connecting the uprights 36 and 37. One shaft is supplied with an operating lever 74 whose handle 75 contains a retractible pin 76, which normally engages the top of the angle 73 and thus retains the shelf in the elevated position (Figs. 1 and 2). The shafts 66 of the remaining mechanism are journaled in the gusset plates 77 forming part of the brackets 38, while the pin of the handle 75 engages a rail portion 39 of the bracket (Fig. 1). In its lowered position, the shelf 65 rests on one end of a platform 78, while the shelf 65a rests on pins 79 located in one of the plates 77. The platform 78 is a sheet metal structure extending transversely across the frame and secured to the angles 73.

The pairs of bearing pedestals 42 and 43 are connected by transverse angle members 81 upon which scraper plates or doctors 82 are secured by screws 83 extending through slotted holes 84 in the members 81. The doctors may be adjusted relative to the surface of the applicator rolls to permit a liquid film of any desired thickness to remain on the roll for subsequent application on the overlying ply of leather.

As shown in Figs. 2 and 4, the pintles 47, 48, and 59 of both applicator rolls 45, 46, and of the traction roll 61, project from their bearings at the rear of the unit and receive sprockets 85, 86, and 87 respectively, which, together with an idler sprocket 88, are connected by an endless chain 91. The pintle 47 of the roll 45 additionally carries a driven sprocket 92 which, through a chain 93, is connected to be driven periodically in a counter-clockwise direction by a driving mechanism which will be hereinafter described.

The upper plies 21 are coated on their lower faces while passing between the applicator roll 46 and its companion tension roll 49. Prior to introduction between these rolls, each ply 21 first passes beneath a guide roll 95 whose pintles 96 are journaled in bearings 97 secured to the uprights 37. The ply then passes over a plate 98 which is affixed to a transverse angle member 100 secured to the pedestals 43. A guide structure, consisting of spaced pairs of transverse bars 99 connected at their ends by connecting bars 101, is secured to the plate 98. Studs 102 are slidably mounted between the bars 99, and they are clamped in position by nuts 103. The studs 102 are suitably spaced so that their heads 104 serve as lineal guides for the edges of the plies in their passage over the plate 98 and into the rolls 46 and 49.

The remaining plies 20 are directed through the lower portions of the frame of the unit and over a guide structure consisting of a pair of spaced transverse bars 105, between which studs 106 are adjustably positioned. The clamping nuts 107 for the studs serve as side guides for the plies 20, which subsequently pass upward about guide rolls 95a, and thence after passing through a second guide structure 108 they are introduced between the applicator roll 45 and the overlying tension roll 49. The guide structure 108 includes spaced pairs of bars 109 secured at their ends to angles 110 which in turn are pivotally secured to the uprights 36. Flanged studs 111 secured by nuts 112 are positioned between the bars 109 to serve as side guides for the plies 20, in a manner similar to that just described in connection with the guide 99.

After receiving a coating of liquid cement from the roll 45, the plies 20 are directed about the traction roll 61. The plies 20 and 21 are joined at the top of the traction roll 45 and from this point onward they travel horizontally together with their coated faces in superimposed relation. Just prior to the juncture of the plies, a strip of sheet cement 113 is applied to the wet or outward face of each ply 20 on the roll 61. The sheet cement is disposed in rolls mounted on a spindle 114 which is removably mounted on brackets 115 secured to the lower portions of the uprights 37 (Figs. 1 and 3). The webs of sheet cement pass upward through a guide slot 115a formed in the platform 78 into superimposed relation with the plies 20, and final interposition between the plies 20 and 21.

The plies 20 and 21, after they have been coated, should be accurately guided into superimposed relation with each other and with the interposed webs 113 of sheet cement. For this purpose, a guide unit 116 is provided, whose guide elements 117 serve to retain the laminae of each belt in alignment. The guide elements 117 (Figs. 2, 3, and 5) are formed with a straight bar portion 118 and a depending curved portion 119 which accurately fits the contour of the traction roll 61. Vertically disposed threaded studs 121 are fixed in the bar portion 118, and transverse holes 122 are drilled in the lower extremity of the portion 119, such holes being intersected by suitable tapped holes for receiving set screws 123. The elements 117 are adjustably suspended from a frame comprising spaced pairs of transverse bars 124, 125, secured at their ends to angle supports 126, formed with open slots 127 and holes 128 at opposite extremities. The studs 121 are positioned between the bars 124, 125, and the bar portions 118 are clamped to the lower faces of the transverse bars by nuts 126a. To prevent weaving of the lower portions of the elements 117, a rod 120 is inserted through the aligned holes 122 for engagement by the set screws 123.

The guide unit 116 may be bodily removed from the machine for accurate adjustment and spacing of the elements 117 and then reinserted by engaging the slots 127 over studs 131 secured to the uprights 36 and by securing the opposite ends of the unit to the pedestals 43 by screws 132 extending through the holes 128.

It will be observed that the bars 125 of the guide unit 116 are formed with depending flanges 129 which contact the top surfaces of the plies 21 to retain the belts against twisting movements. A transverse rod 134, secured to the uprights 36, is disposed at the delivery end of the unit under the left hand bar 125, and the united plies thus receive support as they pass toward the press P.

It will thus be understood that each belt ply 20 or 21 is brought from its spool to and between the pairs of rolls 45, 49, and 46, 49, to receive a coating of cement on one surface thereof. During periods of operation of the sizing unit, the rolls 45, 46, and 61 are positively driven in such directions that each of the applicator rolls 45 and 46 rotates against the belting, thereby brushing the cement into the pores of the leather. The roll 61 rotates in a direction tending to move the belting forward to the press P—an action which is assisted by the mechanism C, hereinafter more fully described. As the freshly cemented surfaces of the plies are brought into superimposed and contacting relation, the strip of sheet cement 113, in a dry state, is fed therebetween, so that the length of belting between the press P and the point of contact on the traction roll 61 constitutes a laminated structure of leather, liquid cement, and dry sheet cement. The components of the belt are thus assembled in the relative positions which they are thereafter to retain, and the softening of the sheet cement, effected by its contact with the liquid cement, takes place in situ.

It will also be observed that provision is made to guide the belting during its entire movement through the sizing unit, so that lateral slipping of the plies with respect to each other is eliminated. This feature not only avoids any disturbance of the setting of the cement, but also overcomes raggedness in the edges of the belting, and the undue squeezing out of cement.

The cement tanks 63 may be readily removed for purposes of cleaning, and are accessible to replenish the cement contained therein. Each applicator roll 45 or 46 is also provided with a doctor 81 so disposed as to limit the roll surface, between doctor and the ply, to the least possible amount, thereby reducing any tendency to form dry or bare spots on the roll during its stationary periods.

The traction mechanism

The traction or stock feeding unit C is located on the end of the press P opposite to the sizing unit S, and it consists of a fabricated frame including pairs of uprights 139 to the upper extremities of which are secured parallel channels or tracks 141 (Figs. 6 and 7). A carriage 140 is disposed between the rails 141, and it is provided with pairs of horizontal bearings 138 which rotatably receive transverse shafts 142, retained against axial movement by collars 143. Flanged wheels 144 are rotatably mounted on the projecting ends of the shafts 142 and are retained by collars 145. The wheels 144 are disposed within the channel formations of the tracks 141, and the carriage is thus mounted for horizontal movement. A depending bracket 146 is secured to the lower face of the carriage, and its lower extremity 147 is formed with a slot 148 which receives the eye 149 of the piston rod 151 of the fluid actuated cylinder A. A stud 152 pivotally secures the eye to the extremity 147.

In the time cycle, which will hereinafter be described, the piston of the cylinder A reciprocates with the attached carriage 140 away from and toward the press P at regular intervals. During the working or active stroke of the carriage (away from the press), the belts are engaged by a clamping device on the carriage, and are thus drawn through the press P and preceding sizing unit S; while at the end of the stroke the clamp releases the belts and the carriage returns to the press for a subsequent operation. During the idle or return stroke of the carriage, a weight 154 (Fig. 1) is lifted by means of a cable 155 which is secured to the bracket 146, as indicated by the numeral 156, and which extends about a sheave 157. As shown in Figs. 6 and 7, the sheave is mounted on a stud 159 which is secured in a bracket 161, which in turn is mounted on a centrally located upright 162. During the working stroke of the carriage, the weight aids the cylinder in performing the work of moving the belts.

The stud 159 is formed with a reduced portion 163 on which a sprocket 164 is rotatably mounted. A second sprocket 165 is secured to a shaft 166 which is mounted in bearings 167, 168 secured to a second upright 162 and to one of the uprights 139 respectively (Fig. 6). A chain 169 is disposed about these sprockets, and it is secured to the bracket 146 as indicated by the numeral 171 (Fig. 7), so that the chain is carried with the carriage in its reciprocating movement.

The shaft 166 also carries a fixed ratchet wheel 173 (Figs. 4 and 6) and an adjacent rotatably mounted sprocket 174 which is connected to the previously mentioned driven sprocket 92 of the sizing unit by the chain 93. The sprocket 174 is provided with a pair of spring pressed ratchets 175 mounted on studs 175a which are riveted to the sprocket 174. It will be observed that the ratchet and wheel 173 actively engage during the active stroke of the carriage, thus causing the rotation of the applicator rolls 45, 46 and the traction roll 61 (Figs. 4 and 7) concurrently with the forward movement of the carriage 140. The proportions of the diameters of the traction roll and its accompanying sprocket 87 are so related to the driving train as to provide a peripheral roller speed which is substantially equal to the lineal speed of the carriage. The sprockets 85, 86 of the applicator rolls are somewhat smaller, so that these rolls rotate at a rate somewhat greater than the traction roller speed, and the drive is disposed so that the applicator rolls rotate counter to the direction of travel of the belt plies, as heretofore explained.

The belt clamping mechanism of the carriage 140 consists of a platen 176 which is similar in structure to the body of the carriage, and which is mounted in superimposed relation thereon by means of vertical guide pins 177. The pins, as shown in Fig. 6, are secured in bosses 178 in the carriage 140 and they are slidably engaged in similar bosses 179 in the platen 176. The ends of the pins project through the bosses 179 and are threaded as indicated by the numeral 181 to receive adjusting nuts 182 which engage compression springs 183. The springs are seated on the boses 179, and thus they constantly urge the platen downward into engagement with the carriage. The opposed parallel faces or jaws 184, 185 of the carriage 140 and the platen 176 are supplied with facings 186 of leather or other resilient material to accentuate the frictional grip on the belts.

The opening and closing movement of the platen 176 is controlled by a toggle mechanism consisting of arms 188 secured to the shafts 142 of the carriage 140, and identical arms pivotally mounted on studs 189 secured to bosses 191 in the platen 176. The ends of each opposing pair of arms 188 are pivotally connected by a stud 192, and the studs on each side of the carriage are secured to a horizontally extending bar 193. The movement of the arms and bars to the right (Fig. 7) is limited by stop pins 194 which are engaged by one pair of arms when the toggle mechanism is just past dead center position. Obviously, in this position the platen is locked against closing movement.

When the carriage arrives at the end of its idle stroke (from the position of Fig. 7 to that of Fig. 8) the protruding ends of the bars 193 strike spring-pressed abutment arms 195 secured to the press P, which cause the movement of the bars and accompanying toggle arms 188 to the left to a position slightly past dead center. At this time, further closing movement of the platen 176 is prevented by the engagement of a latch 196 with a dog 197 secured to one of the carriage shafts 142. The lever 196 is pivotally mounted on one side (Fig. 6) of the bracket 146 by a stud 199. A spring 201 constantly urges the latch into engagement with the dog 197.

The latch 196 is formed with a projecting portion 202 which, in the right hand position of the carriage (Fig. 8) is disposed under a release plate 203 secured to the platen 200 of the press P. During the opening movement of the press, the platen 200 thereof moves downward, the plate 203 thereon engages the portion 202 and thus swings the latch 196 out of locking relation with the dog 197. The platen 176 of the carriage is thus fully released for closing movement under actuation of the springs 183, and it accordingly clamps the interposed belts to the carriage, and, during the subsequent active stroke, the belts are in effect united with the carriage.

As the carriage nears the limit of its active stroke, the left hand extremities of the toggle bars 193 strike a fixed release bar 204 (Fig. 7), which causes the movement of the toggle mechanism to the right to the previously mentioned locked position, and the carriage platen 176 is thus raised, immediately releasing the belts. The bar 204 is disposed transversely across the tracks 141 and it is secured thereto by rivets 205. It will be observed that the dog 197 is secured to the shaft 142, the rotation of which is controlled by the movement of the connected toggle link 188 and bar 193. The holding latch arrangement therefore serves as a safety mechanism, preventing the full lowering of the clamping platen 176 unless and until the press P is opened.

The press

The press P is of the well known hydraulic type having a fixed head 206 and a ram operated platen 200 which is covered with a cemented cork mat 207. As the belts are intermittently drawn through the press, during the open periods thereof, they are lineally guided by longitudinally extending positioning bars 208 (Figs. 7 and 9), whose extremities project beyond the ends of the press and carry vertical threaded studs 209. Each stud 209 projects through an angular clamp 211, one end 212 of which rests on the bar 208. The upper end of each clamp is formed with a hook portion 213 which engages a rail 210 secured to each end surface of the head 206, and it is clamped thereto by a nut 214 which engages the stud 209. When the nuts 214 of the various bars are loosened, the bars and accompanying clamps may be positioned to any desired spacing to suit the widths of the belts.

In the use of presses for the manufacture of belting, the outermost edges of the belts have heretofore invariably shown thinning of the cement layer, resulting in the development of ply separation. I have discovered that the provision of the bars 208 obviates this defect, which has been caused by the buckling of the cork mat at the margins of the pressure zone. The bars as shown in Fig. 9 are preferably slightly thinner than the belts, and their positioning protects the margins of the belts by preventing the cork from buckling at a point immediately adjacent thereto. That is to say, the bars 208 are slightly thinner than the superimposed plies which are introduced to the press, so that, upon the application of pressure, the belting is first contacted and is compressed slightly to the thickness of the bars themselves, which thereupon have approximately the same thickness as the compressed and cemented belt.

The timing mechanism

The press P and the operating cylinder A for the carriage 140 are controlled for related cyclic movements by a mechanism located in a control box B, which includes a platform 217 having a vertical bracket portion 218 to which is secured the operating valve 219 for the cylinder A. The operating valve 221 for the hydraulic press P is mounted beneath the platform 217, and its operation will first be described (Fig. 7).

A motor operated gear reducing mechanism 222 is mounted on the platform 217, and a cam 220 is secured to the driven shaft 223 thereof. The cam, which is formed with raised portions 225, 226, is operated at a slow but constant rate of speed. A lever 227 having an attached cam roller 228 and a slotted extremity 229 is pivotally secured by a stud 231 to a depending bracket on the platform 217. The slotted end of the lever engages a pin 232 of an operating handle 230 of the press valve 221. A spring 233 secured to the handle tends to retain the handle in its upper position, and it also retains the roller of the accompanying lever 227 in contact with the periphery of the cam 220. During each rotation of the cam, the raised portion 225 thereof engages the roller 228 and causes the lever 227 to move the valve handle 230 rapidly to its open position (dotted lines, Fig. 7). Subsequently, the handle is moved to a neutral or central position when the roller follows the portion 226 of the cam, and, after a short period the valve handle is restored to its upper position, when the roller engages the dwell portion 224 of the cam. In Fig. 7 the roller 228 has left the neutral portion 226 of the cam and it is just entering engagement with the dwell portion 224.

When the valve handle 230 is in its upper position, the press is connected for closing movement, and the platen 200 thereof rapidly moves upward into pressing engagement with the belts; while, when the handle is in its lower position, the pressure is released and the platen immediately opens to the position shown. In the neutral position of the handle, all movement of the press platen ceases preparatory to closing movement thereof. Inasmuch as the operating fluid connections to hydraulic presses are well known in the art, they are not specifically shown herein, and it will be understood that fluid under pressure from an accumulator or pump is available for operation of the press.

The cylinder A is in the present case pneumatically operated from a suitable pressure source, and it may be mentioned that, if desired, it may be hydraulically operated with slight modification in the valve control system hereinafter set forth.

The operation of the cylinder valve 219 is advantageously made responsive to the physical movement of the press platen 200. A valve operating handle 235 is secured to the valve stem 236 which projects through to the rear of the bracket portion 218 (Figs. 6 and 7). The vertical position of the handle, as shown, is the neutral one, wherein both ends of the cylinder are disconnected from the fluid circuit. Movement of the handle to the right and left of this position conditions the cylinder to move the carriage in its working and inactive strokes respectively. The handle is constantly urged towards its right hand position by an attached spring 237.

The press platen 200 carries a depending rack 238 which engages a pinion 239 secured to a shaft 240. The shaft 240 is mounted in a bearing 241 in the bracket portion 218, and it carries an arm 242 having an arcuate face 243, while the handle 235 is provided with an attached cam roller 244 which is in the path of movement of the arm 242.

To follow the cycle of movement of the carriage 140 and the accompanying motivating piston rod 151 from the end of the active stroke (Fig. 7), it will be noted that the carriage platen 176 has just been opened, while the press platen 200 is rapidly closing. During the closing movement of the platen 200, the accompanying rack 238 rotates the pinion 239 and causes the arm 242 on the pinion shaft to swing to the left during which it strikes the roller 244 of the cylinder valve handle 235, and thus moves the handle to its extreme left hand position. Pressure is thus applied to the right hand surface of the piston, causing the movement of the carriage to the right, or to the position of Fig. 8. During this movement, the carriage platen is raised, and thus the belts are not disturbed.

The carriage remains in this position until the platen 200 has performed its pressing operation on the belts and starts to open under the control of the cam 220, whereupon the pinion 239 is rotated in the opposite direction, and the valve handle 235 is released by the arm 242 and is permitted to swing to its extreme right hand position under the force applied by the tension spring 237. The carriage 140, whose platen 176 now actively grips the belts due to the described releasing action of the latch 196 by the press platen, is now moved to the left, drawing the belts with it.

When the carriage nears the termination of the active stroke, the valve handle 235 is caused to be moved to its neutral position by the carriage to effect an appreciable deceleration. This action is obtained by a connection including a rod 246 whose ends are pivotally secured to the valve handle 235 and to a lever 247 pivotally secured to the upright 162. The rod carries an adjustably movable collar 248 which is adapted to be engaged by a finger 251 secured to the carriage bracket 146, whereby the rod is actuated and the accompanying handle 235 is moved to its neutral position. The cam control of the press is so proportioned that, as the carriage ends its active stroke, the press immediately begins to close, whereupon a repetition of the cycle described is obtained.

General operation

It will be observed that the active stroke of the traction device C is roughly an integral fraction of the length of the press. The ratio, in the present instance, is one to three, so that each section of belting receives three successive pressings before emerging from the press. It will also be noted that the length of freshly cemented belting exterior of the press is also substantially equal to the length of the stroke of the traction carriage. This insures the uniform partial setting of the cement of the pre-treated portions during the time interval in which preceding lengths of belting are being pressed. Thus, each section as it enters the press has been similarly treated, and, as a result, a uniform product is obtained.

In the practical use of the invention, good results may be obtained with a time cycle (which is reflected in the proportions of the timing cam 220) in which the press is closed for approximately fifteen seconds and open for three seconds. Thus, each section of belting as it intermittently progresses through the press is under pressure for a total of forty-five seconds, while during the three-second opening intervals the traction carriage engages and draws a freshly cemented section of belting into the press. The pre-setting time of fifteen seconds thus allotted to the ply and cement assembly before entering the press permits of the softening of the sheet cement, and the partial evaporation of the solvent, to an extent commensurate with maximum adhesiveness.

Inasmuch as the functioning of the various parts of the invention, and their relationships with each other, have been pointed out during the progress of this description, it is believed to be unnecessary to repeat, by way of further summary, the matters hereinabove explained. It will, of course, be apparent that the specific form of machine herein described is susceptible of numerous modifications and variations, without departure from the principles thereof, and that various aspects of the entire invention adapt themselves to practical use without resort to or employment of other features. Thus, other power mechanism than the cylinder A may readily be employed, and the specific details of the timing mechanism admit of numerous alterations. It will therefore be understood that the invention is not to be regarded as limited to the precise features herein set forth, but should be construed as encompassing all such variations as are within the context of the following claims.

Attention is invited to my prior and copending application, Serial No. 84,887, filed June 12, 1936, now Patent No. 2,119,476, patented May 31, 1938, in which I have described and claimed an invention, features of which are incorporated herein, as will be readily apparent from a consideration of the specification thereof.

I claim:

1. In a belt making machine, a press and means for opening and closing the press at regular intervals, a cementing unit disposed adjacent one end of the press for cementing and uniting a pair of belt plies, said belt plies being directed through said press, a traction unit on the other end of the press and comprising a carriage having a movable platen mounted thereon, means supporting the carriage for lineal movement, drive means for moving the carriage toward and away from the press, control means operating in timed relation to the operation of the press for rendering the carriage drive means operative to move the carriage away from the press when the press is open, means for operating the carriage platen during such movement to clamp the plies to the carriage, and means for releasing the platen from the plies during the opposite and return movement of the carriage.

2. A belt making machine comprising a press, a traction unit and a cementing unit disposed adjacent opposite ends of the press, guide means in the cementing unit for directing a pair of plies of belting and a web of sheet cement therethrough, means in the cementing unit for uniting the plies in superimposed relation with the web of sheet cement interposed therebetween, means for opening and closing the press at regular intervals, said traction unit comprising a carriage having a clamping mechanism thereon, means for reciprocating the carriage toward and away from the press in timed relation to the closing and opening movements of the press respectively, means for operating the clamping mechanism when the carriage moves away from the press, said mechanism engaging the united plies and clamping them for movement with the carriage, whereby lengths of belting are intermittently withdrawn from the press after each pressing operation.

3. A belt making machine comprising a press, a traction unit and a cementing unit disposed adjacent opposite ends of the press, said cementing unit being adapted to apply cement to one face of a pair of separate plies of belting, means in the cementing unit for uniting the plies in superimposed relation and directing them into the press, said traction unit being adapted to engage and draw the united plies through the press and preceding cementing unit, drive means for operating the traction and cementing units simultaneously, actuating means for opening and closing the press, and control means operating in timed relation to the operation of the press for rendering said unit drive means operative when said press is open.

4. A belt making machine comprising a press, a traction unit and cementing unit disposed adjacent opposite ends of the press, a pair of rolls mounted in the cementing unit, tanks containing liquid cement in which a portion of each roll is immersed, guide means in the cementing unit for directing a ply of belting over each roll, means connecting the rolls for simultaneous operation, said rolls when rotated applying a coating of liquid cement on the belting plies, and other guide means in the cementing unit for directing the plies into superimposed relation with their coated faces joined, said belting being directed through the press and received in the traction unit, said traction unit being adapted to engage and draw the united plies through the press and cementing unit, drive means for operating the traction unit and the rolls of cementing unit simultaneously, actuating means for opening and closing the press, and control means operating in timed relation to the operation of the press for rendering said traction unit drive means operative when the press is open.

5. In a belt making machine, a press and means for opening and closing the press at regular intervals, a cementing unit for cementing and uniting a pair of belt plies, a traction unit for engaging the united plies and drawing lengths thereof through the press and preceding cementing unit, and control means operating in timed relation to the operation of the press for rendering said traction unit operative when said press is open.

6. In a belt making machine, a press having fixed and movable platens, one of the platens being covered with a mat of resilient material, parallel bars disposed between the platens and adjustably secured to one of the platens, and means for directing cemented plies of belting between the bars in the press, said bars being of substantially the same thickness as the belting.

7. In a belt making machine including an intermittently operated platen press and means for transmitting belting through the press, a carriage mounted for reciprocatory movement toward and away from the press, a clamp mounted on the carriage for vertical movement into and out of engagement therewith, means for moving the clamp, an abutment remote from the press adapted to engage said moving means when the carriage is adjacent thereto to move the clamp away from the carriage, an abutment on the press adapted to engage the clamp moving means to cause said clamp to close when the carriage is adjacent the press, latch means for arresting the motion of the clamp toward closed position, means on the press for releasing the latch when the press is operated to open position, whereby the clamp may engage material on the carriage only when the press is released, a power means for reciprocating the carriage, means operated by the opening movement of the press for operating the power means to move the carriage away from the press, and means operated by the closing of the press for reversing the force of said power means and thereby returning the carriage to the press.

8. In a belt making machine, a press including a pair of relatively movable platens, valve means for controlling the movement of the platens with respect to each other, constant speed means for operating the valve means, whereby the press is caused to open and close in regular time cycles, a carriage mounted for reciprocatory movement adjacent the discharge end of the press, a clamp mounted on and movable toward and away from the carriage, means remote from the press and at the end of the stroke of the carriage for moving the clamp away from the carriage, means interposed between the carriage and press for moving the clamp into engagement with the carriage, a latch for holding the clamp in slightly disengaged position, power means for reciprocating the carriage, means controlled by the opening of the press for disengaging the latch and actuating the power means as sequential operations, and means controlled by the closing of the press to reverse the application of power to said carriage.

9. A belt making machine comprising a press, means for opening and closing the press at regular intervals, and a traction unit, said traction unit comprising a carriage, a platen mounted for guided movement on the carriage, a toggle mechanism connecting the platen to the carriage and being operable to move the platen into engagement with the carriage, resilient means for urging the platen into engagement with the carriage, means supporting the carriage for lineal movement, drive means for moving the carriage toward and away from the press, control means operating in timed relation to the operation of the press for rendering the carriage drive means operative to move the carriage away from the press in a traction stroke when the press is open, means simultaneously acting on the toggle mechanism for releasing the platen to clamp the plies to the carriage, and means actuating the toggle mechanism at the end of the traction stroke to lift the platen and release the plies.

10. In a belt making machine, a cementing unit comprising a machine frame, a pair of applicator rolls rotatably mounted in the machine frame, tanks containing liquid cement in which a portion of each roll is immersed, a third roll rotably mounted in the frame, means connecting the applicator rolls for simultaneous operation, means in the frame for directing a plurality of spaced plies of belting over each applicator roll, guide means for receiving the plies from each roll for direction in superimposed pairs over the third roll, said guide means comprising a frame structure removably secured to the machine frame, and guide bars adjustably secured in spaced relation on said structure and each formed with a portion extending in sliding contact about a portion of said third roll, said bars receiving the united ply pairs therebetween for guidance over the third roll.

11. In a belt making machine, a cementing unit provided with means for applying a coating of liquid cement to one face of a pair of belting plies, means for joining the plies in superimposed relation comprising a roll, guide means for directing the plies into juxtaposition upon said roll, including a pair of parallel bars each formed with a depending portion extending in sliding contact about a portion of said roll, said bars receiving the plies therebetween for guidance over said roll.

12. In a belt making machine, a cementing unit provided with means for applying a coating of liquid cement to one face of a pair of belting plies, means for receiving the plies from the unit and uniting the plies in superimposed relation, said means comprising a roll, guide means for directing the plies into juxtaposition upon said roll including a pair of parallel bars each formed with a depending portion extending in sliding contact about a portion of the roll, means for mounting a roll of sheet cement adjacent to said roll, and other guide means for guiding the sheet cement to a position between said bars for interposition between said plies.

13. A belt making machine comprising a press having platens adapted to be contacted and spaced with respect to each other, a cementing unit disposed adjacent one side of the platens and adapted to introduce laminated sheet material between said platens when the same are spaced, a traction unit disposed at the opposite side of the platens, means in said cementing unit for applying cement to one face of each of a pair of belt plies and to superimpose said plies with the cemented faces thereof in contact, said traction unit comprising spaceable jaw members, means for reciprocating said traction unit toward and away from the press, means for closing the jaws of the traction unit as it moves away from the press to pull pressed belting through the press, and means for opening the jaw members of the traction unit when said unit has moved away from the press approximately an integral fractional length of the press platens, whereby each unit of belting introduced to the press is subjected to more than one application of pressure between said platens.

14. A belt making machine comprising a press having a pair of substantially horizontally disposed and vertically spaceable platens of extended length, press control means for periodically spacing said platens and bring them into juxtaposition, a ply cementing unit disposed at one end of the press, said ply cementing unit including means for superimposing belt plies with cement interposed therebetween and means for directing said superimposed plies in the space between said platens, a traction unit disposed at the opposite end of the press, said traction unit including a reciprocable carriage having a movable upper platen disposed thereon, drive means for reciprocating the traction unit, drive means for the cementing unit, means for interconnecting the traction unit and cementing unit drive means when said traction unit moves away from the press, means operative during the movement of the traction unit away from the press for holding the platen thereof against said carriage, whereby belting disposed on said carriage is conveyed through the press, means for spacing the traction unit platen away from the carriage when the traction unit approaches the end of its movement away from the press, means for limiting the movement of the carriage to a fraction of the length of the press platens, means for disengaging the cementing unit drive means from the traction unit drive means when the traction unit moves toward the press, and means operating in timed relation to the operation of the press for actuating the traction unit drive means.

15. A belt making machine comprising a press having a pair of substantially horizontally disposed and vertically spaceable platens of extended length, press control means for opening and closing the press and thereby space said platens or bring them into juxtaposition, a traction unit at one end of the press, said unit comprising a reciprocable carriage and a movable platen thereon, means for driving the traction unit away from and toward the press, means operative during the movement of the carriage away from the press for bringing the platen thereof into juxtaposition with the carriage, means for limiting the stroke of the carriage to a fraction of the length of the platens, means for spacing the platen of the traction unit from the carriage at the end of the stroke thereof, means under the control of the opening and closing of the press for actuating the traction unit drive means in each direction, a cementing unit at the opposite end of the press, drive means for the cementing unit, means for operating the cementing unit drive simultaneously with the motion of the traction unit away from the press, and means for transmitting through the cementing unit a length of belting equal to the stroke of the traction unit.

JAMES A. WEBB.